United States Patent [19]
Chandler et al.
[11] Patent Number: 4,475,163
[45] Date of Patent: Oct. 2, 1984

[54] SYSTEM FOR CALCULATING AND DISPLAYING CABLE PAYOUT FROM A ROTATABLE DRUM STORAGE DEVICE

[75] Inventors: William R. Chandler, Sedro Woolley, Wash.; Donald R. Cooper, North Hollywood, Calif.

[73] Assignee: Continental Emsco, Dallas, Tex.

[21] Appl. No.: 203,763

[22] Filed: Nov. 3, 1980

[51] Int. Cl.[3] .......... G06F 15/20
[52] U.S. Cl. .......... 364/562; 364/444; 364/565; 377/17
[58] Field of Search .......... 364/561, 562, 565; 235/92 DN; 33/126.5, 126.6, 133, 140, 142; 377/3, 17, 18

[56] References Cited

U.S. PATENT DOCUMENTS

| | | | |
|---|---|---|---|
| 3,510,632 | 5/1970 | Strandberg | 235/92 DN |
| 3,564,219 | 2/1971 | Mutziger | 364/562 |
| 3,953,713 | 4/1976 | De Ligt | 235/92 DN |
| 4,013,944 | 3/1977 | Benya et al. | 364/562 |
| 4,052,599 | 10/1977 | Whiteley et al. | 364/562 |
| 4,114,435 | 9/1978 | Patton et al. | 364/562 |
| 4,166,976 | 9/1979 | Ruhnau et al. | 364/565 |
| 4,181,960 | 1/1980 | Tateishi et al. | 364/562 |
| 4,232,371 | 11/1980 | Kamoto | 377/18 |
| 4,280,159 | 7/1981 | Nakayama | 364/562 |
| 4,334,217 | 6/1982 | Nield et al. | 377/18 |
| 4,356,557 | 10/1982 | Bell et al. | 364/562 |

*Primary Examiner*—Errol A. Krass
*Attorney, Agent, or Firm*—Thomas F. Daley

[57] ABSTRACT

A system for sensing, computing, and displaying the length and the speed of chain or cable payout or reel in. The system employs only a single sensor which measures cable drum movement. The calculation function is accomplished by a microprocessor or minicomputer which is programmed with the basic dimensions of the cable and cable drum and with the required calculation formulae. A display gives continuous readout to the operator of the cable payout and speed values from a predetermined cable reference point. The system is directly employable in drum payout and recovery systems regardless of their application. The cable references may be of steel, rope or even chain and the system may be incorporated in helicopter or aircraft cable systems, mine hoists or elevator systems wherever a precise control or readout of cable payout is required.

10 Claims, 7 Drawing Figures

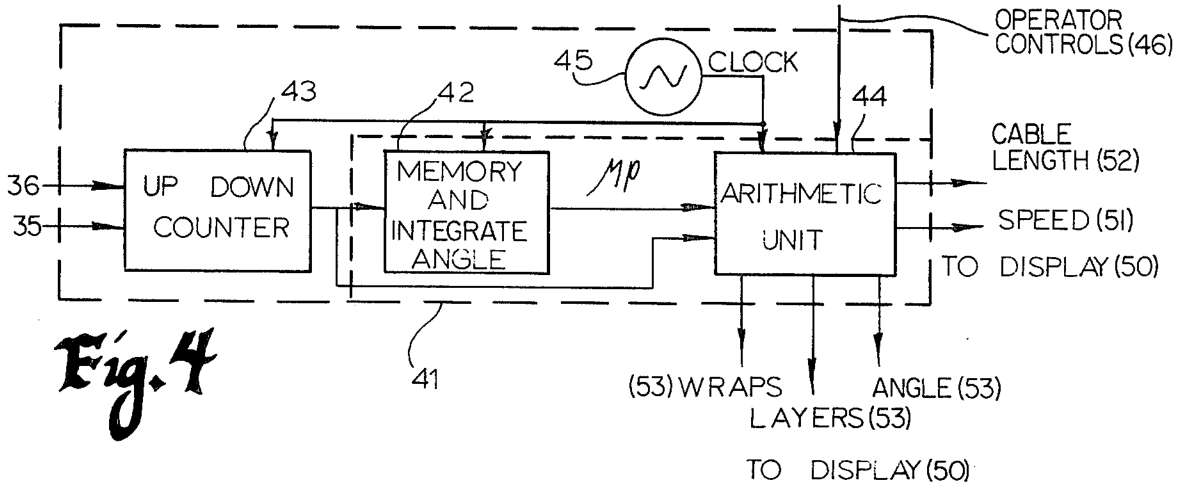
Fig. 4
Fig. 2
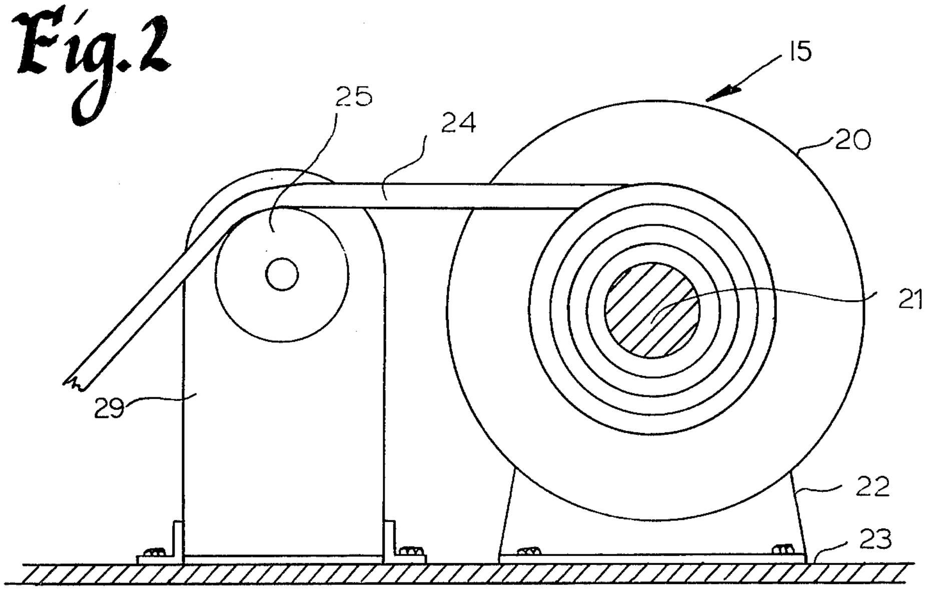

SYSTEM FOR CALCULATING AND DISPLAYING CABLE PAYOUT FROM A ROTATABLE DRUM STORAGE DEVICE

TECHNICAL FIELD

The present invention relates to a means for sensing computing the feed rate (speed) and the length of feed of cable material from a typical cable handling system.

BACKGROUND ART

From earliest times the need has existed for effective anchoring systems for vessels to resist wind and current. Single anchors have given way to multiple anchors, sea anchors and a variety of anchor handling techniques to precisely position and securely hold a vessel against wind and current.

A whole new dimension in anchoring and anchor handling arose with the expansion of offshore drilling which employs a floating drilling barge that needs to be located and maintained over an oil well located on the ocean bottom. Due to the immense cost of offshore drilling operations, the continuation of these drilling operations during adverse weather conditions, even with up to fifteen foot waves, is essential to economically proceed with such operations.

Similarly, submarine pipeline laying operations require the precise movement of a pipeline laying vessel along a specific course. The submarine pipeline laying operation is preferably continuous since interruption of the operation presents even greater difficulties upon resumption than is the case for the offshore drilling operation.

During normal drilling operations a number of anchoring systems have evolved for positioning the drilling vessel, e.g. barge, by employing from eight (8) to as many as fourteen (14) anchors. One essential element for this anchoring system is an automatic positioning system that simultaneously controls all anchor lines. One example of an improved pipeline laying barge is described in the article The Third Generation Lay Barge by G. H. G. Lagers et al. copyright 1974, Offshore Technology Conference design parameters for improved stability for a pipeline laying barge or a moored drilling vessel by employing dynamic controls are described in the article Augmentation of a Mooring System Through Dynamic Positioning by J. S. Sargent et al, copyright 1974, Offshore Technology Conference. Both articles was presented at the Sixth Annual Offshore Technology conference at Houston, Texas May 6–8, 1974.

The dynamics of deep water anchoring systems and a fundamental block diagram for manual or automatic feedback control systems for mooring lines either alone or in combination with thrusters is described in an article by Alan C. McClure, Naval Architect, that appears on pages 18–24 of the Feb 1977 of Ocean Resources Enginering.

Finally, a number of patents have issued on automated ship control systems and mooring aids. These patents include:

| | | |
|---|---|---|
| A. BOUY MOORING SYSTEMS | | |
| 3,980,038 | Dashew et al | 9/14/76 |
| 3,956,742 | R. D. Karl | 5/11/76 |
| B. ALONG SIDE MOORING | | |
| 3,965,841 | H. M. W. Croese | 6/29/76 |
| 4,055,137 | Motai et al | 10/25/77 |
| 3,913,396 | G. Elliot | 10/25/75 |
| 3,886,887 | Cunningham et al | 6/03/75 |
| 3,613,625 | Halsingborg et al | 10/19/71 |
| C. MULTIPLE ANCHOR MOORING | | |
| Re 29,373 | H. C. Boschen Jr. | 8/30/77 |
| 3,948,201 | I. Takeda et al | 4/06/76 |
| 4,070,981 | Guinn et al | 1/31/78 |
| 3,552,343 | P. Moulin | 1/21/69 |
| 3,031,997 | W. A. Nesbitt | 5/01/62 |
| D. SUBMARINE PIPELINE LAYING | | |
| 3,893,404 | Chandler et al | 7/08/75 |
| E. SUBMERGED CABLE ADVANCED VESSEL | | |
| 3,785,326 | S. B. Mullerheim | 1/05/77 |
| F. SONAR POSITION SENSING SYSTEM | | |
| 4,017,823 | Cooke et al | 4/12/77 |

In each of the above-referenced systems, cable payout information, if essential to control, is obtained only indirectly by sensors coupled to winches or idle rollers. However, sensors coupled to winches or idler rollers sensors tend to produce a certain amount of errors due to the cable slippage that is typical in such systems Similarly, the payout or reel-in speed of the cable, which are important in large maneuvering and where there are two corresponding anchors that are preferably synchronously moved, will be incorrectly measured as a result of this cable slippage. One means for eliminating the effect of slippage, is to directly couple the sensors to cable drums. However, such systems have been unable to account for the unevenness of cable layerings, and the changing of cable length due to layer change and therefore only provide average or approximate values.

DISCLOSURE OF THE INVENTION

The present invention provides for a system for feeding cable from at least one rotatable cable feed means and for precisely measuring length of cable feed and current feed rate. The system comprises a cable having a predetermined diameter, a rotatable drum means having a core with a predetermined length and diameter for storing and feeding said cable and also having edge flanges for retaining said cable thereon in a plurality of layers with each layer having a predetermined diameter and number of wraps per layer, and a drive means suitably supported for rotating said drum means. A sensor means is adapted to detect the angular rotation of the drum and the speed of rotation of the drum means and to provide signals corresponding to increments of rotation of the drum means. A computer means, coupled to the sensor means and adapted to receive inputs of the signals corresponding to the incremental angular rotation from the sensor means is employed to provide output signals indicating feed rate and the length of cable feed from the drum means.

BRIEF DESCRIPTION OF THE DRAWINGS

This invention may be more clearly understood from the following detailed description and by reference to the drawing in which:

FIG. 2 is a simplified side elevational view partly in section of cable handling gear of a type that typically would employ this invention;

FIG. 4 is a simplified block diagram of a preferred embodiment of the present invention;

DETAILED DESCRIPTION OF THE INVENTION

In the field of offshore drilling for petroleum the special ships, barges and semi-submersible drilling platforms which are typically used, employ mooring equipment that includes anchors, and anchor chains or cables to either propel the vessel, or hold the vessel securely in a predetermined position or to move the vessel within prescribed limits of its present anchorage. As an example a number of anchors may be used, e.g. eight, and by a simultaneous and controlled payout or infeed of corresponding anchor lines, i.e. the anchor lines that are diagonally positioned relative to one another, the vessel may be moved in any particular direction to a desired new position. To accomplish this movement requires a precise knowledge of the cable payout or infeed for each of the several anchor lines during the maneuver and the rate at which such cable is paid out or fed in and particularly so as to enable the corresponding anchor lines to be synchronously controlled with respect to feed and feed rate. Simply providing an estimate of the length and speed at which the anchor line is to be paid out may not be sufficient since such estimates are based on a variety of assumptions and other factors such as the weight of the anchor line and associated anchor, and the particular environmental conditions, particularly winds and currents may negate the assumptions and produce significant errors.

Figure 1:
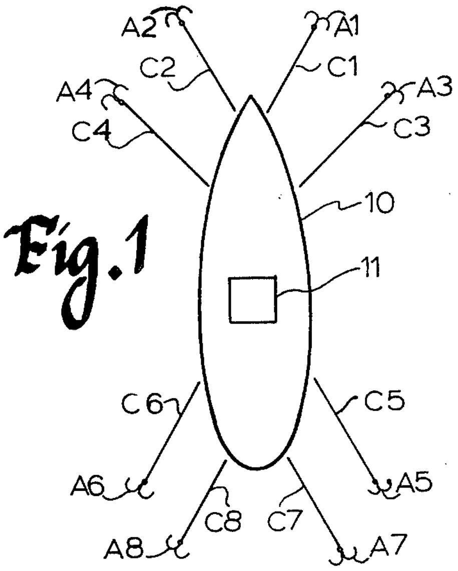
FIG. 1 is a simplified top plan view of a drilling ship and its typical mooring arrangement.

FIG. 1 shows in schematic form a typical mooring arrangement of a vessel 10 having a drilling well position 11 through which drilling is accomplished. Vessel 10 is moored by a plurality of anchor lines or cables identified as cables C1 through C8 where C1 corresponds to C8 C2 to C7, C3 to C6 and C4 to C5. The simultaneous monitoring of all eight chains is important to ensure precise position control of the ship 10 for movement, as for example during submarine pipeline or trenching applications or for changing drilling position, and therefore each anchor line C1 through C8 will be monitored individually. Each of the cables or chains C1 through C8 include an anchor A1 through A8, respectively. Finally, each anchor line C1 through C8 also has an associated cable handling system on the ship or platform 10.

The basic mechanical elements of a typical cable handling system 15 that would be employed to handle anchor lines C1 through C8 are shown in FIG. 2. The system 15 includes a drum 20 having a shaft 21 and a support stanchion 22 which is secured to deck 23. Cable 24 is partially wound over shaft 21 between the ends of drum 20 and extends over a guide sheave 25 suitably supported at 29 and from there to an anchor, e.g. A1 through A8, not shown. Drum 20 rotates on shaft 21 and is driven by a winch drive motor and suitable gearing, also not shown. Innumerable variations of the cable or chain handling system 15 can be employed for adaptation to different types of vessel or service, but each system will include these basic elements or their equivalents. The present invention is, therefore, also applicable to similar types of systems such as winches for use on helicopter hoists, elevators, mine hoists, and the like and windlasses for handling chain in a variety of services.

Figure 3:
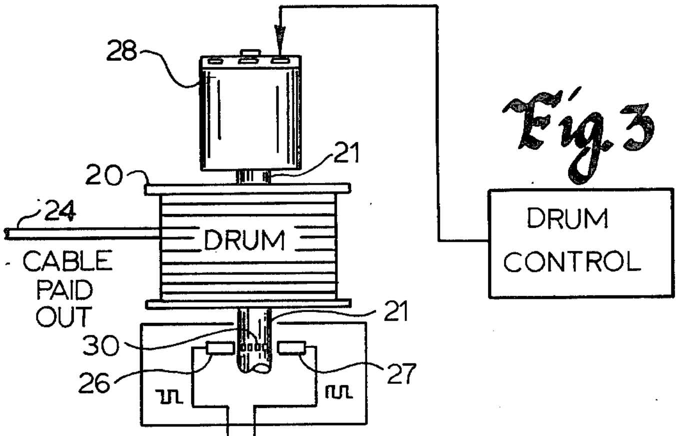
FIG. 3 is a simplified mechanical schematic and electrical block diagram of one embodiment of the present invention.
Figure 3:
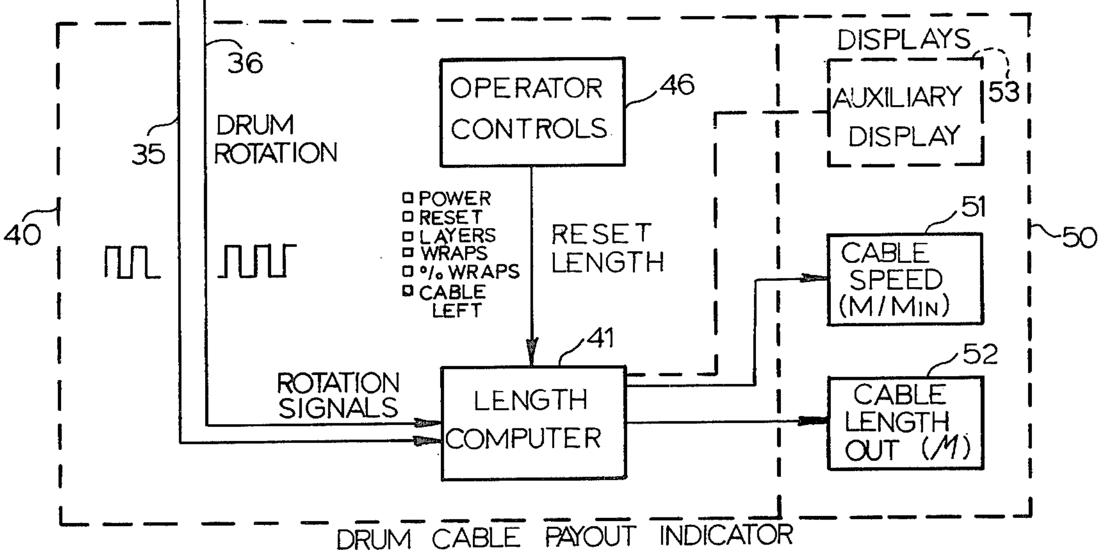

Referring now to FIG. 3, there is shown an operational system employing this invention which includes drum 20 on shaft 21, as previously described in FIG. 2, and showing that shaft 21 is driven by a drum drive motor 28. In one typical embodiment of the present invention, cable 24 wound on drum 20 is 3" in diameter (7.6 cm) and over 11,000 feet (3385 m) in length. To accommodate this typical size cable 24, drum 20 should be about ten feet (3 m) in diameter and therefore the entire length of cable 24 could be wound in multiple layers on drum 20 as, for example, during ship movement. Cable 24 would typically be wound in ten to fifteen layers with approximately 40 turns per layer depending upon the precision with which cable layering is accomplished. In one embodiment drum 20 includes a Lebus Lagging surface on the storage face. This type of surface provides a series of grooved tracks to accomodate the desired number of wraps in a layer. The next layer would include less wrap since the individual wraps would be positioned in the grooves between the wraps of the first layer. Since cable 24 is to be monitored for speed and quantity of payout or reel in, it is important to have a knowledge of the starting position of the cable by cable layers since the instantaneous cable payout speed and quantity is a function of the number of layers remaining on drum 20 as well as the drive speed of motor 22.

The direction and speed of drum 20 can be sensed by a single solid state sensor such as a Hall Effect, Eddy Current Killed Oscillator (ECKO) or an optical encoder, but the invention is not limited to these particular sensors. Where the environment for use of the sensor is particularly harsh the optical encoder type sensor may not perform adequately. One alternative in such harsh environments is a bi-directional zero velocity magnetic pick-up sensor. This type of sensor has its own peculiar problems, however, in that it is sensitive to low vibration amplitudes and therefore its mounting frame must be substantial enough to damp the vibration or it must be properly insulated from such vibration. In one preferred embodiment of the present invention an optical encoder is employed in a relatively mild environment. The preference for optical encoders is due to their precision and reliability. This particular embodiment comprises a pair of photo sensitive devices such as light source-photo cell combinations 26 and 27 directed toward a predetermined pattern 30 of, for example, alternate stripes on shaft 21 where it extends outwardly to accommodate gearing or the like. The dual photo sensitive devices are prefered because of their simplicity and reliability, the lack of wearing contact with the rotating shaft 21, relative freedom from damage by the elements when properly housed and production of an electrical signal available for processing. While other types of sensors may be used, light source-photo cell sensors 26 and 27 in association with pattern 30 can provide a series of pulses. The pulse rate is usable as a function of the speed of rotation of shaft 21 and of drum 20 which would preferrably be keyed to shaft 21, and the phase of the pulse trains from respective sensors 26 and 27 could be indicative of the direction of rotation, e.g. for determination of payout or infeed. In a typical embodiment of the invention shaft 21 is marked such that each pulse is indicative of 0.1% of a full revolution. However, it should be observed that pattern 30 can be designed for even more minute divisions of the rotation of shaft 21 and therefore provide an even more precise knowledge of the actual position of drum 20.

Obviously, an alternative and technically equivalent sensor to the optical encoder type sensor could be employed where the circumstances, particularly the environment, so warrant. For example, in another preferred embodiment of the present invention, a magnetic pickup device could be employed in conjunction with a gear that is keyed to shaft 21 and hence determinative of the position of drum 20. In this embodiment the pattern is already available in the form of gearteeth and the only set-up requirement is for the magnetic pickup. A suitable magnetic pickup that is employed in one embodiment of the present invention is AIRPAX's (a division of North American Phillips Corporation, 6801 W. Sunrise Blve., Ft. Lauderdale, Fla. 33313) model 4-0002 as described in Airpax's sensor catalog no. 0200-574 at pages B-13 and B-14.

As shown in FIG. 3, the pulses generated by light source photo-cell sensors 26 and 27 or by a magnetic pickup sensor are introduced into the information processing section 40 of this embodiment of the invention. Processing section 40 comprises a length computer 41, further described by the block diagram shown in FIG. 4, operator controls 46 for initial setting or resetting of the length computer 41 reference inputs, and a display section 50. Length computer 41 is the basic element of processing section 40 and it includes, as shown in FIG. 4, a memory 42 for storing the number of pulses generated from pattern 30 or from gearteeth where a magnetic pickup sensor is employed and pass along wire leads 35 and 36, and up/down counter 43 to count the net value as accumulated from a predetermined reference zero position, e.g. '0' cable paidout, a calculating capability in arithmetic unit 44 to perform the required computations and a clock source 45 to provide a timing reference for computer 41 and for arithmetic unit 44 in order to enable calculation of speed determinations and for providing a real time display, if desired. Processing computer 41 also has provisions for input from the manual or operator controls 46 of a variety of data and commands as, for example power on, and reset references or reset time. (?)

Computer 41 is also capable of employing a variety of additional controls or displays as desired for a particular embodiment. One example is a display or signal to denote the time to payout all remaining cable, a variable that is dependent on the instantaneous speed rate.

The resulting outputs from processing computer 41 are directed to display section 50, as shown in the right hand portion of processing section 40 of FIG. 3, which typically comprises a cable speed display 51 and a cable payout display 52 as well as a plurality of supplementary auxiliary displays 53 that may be desired by the user for a particular application, such as 'number of layers remaining', 'instantaneous cable speed (out or in) on drum', 'number of complete wraps of the current working layer', or the 'fraction of partial wrap'. It should be noted that the last display item 'fraction of partial wrap' is generally available only where the sensor employed in the invention provides a high degree of division to drum 20's position, i.e. by an extremely fine pattern 30 used in conjunction with an optical encoder. Hence, to a limited degree the type of sensor system employed in this invention will impose some limitations as to the type of information that is available and the precision of that information.

Figure 5:
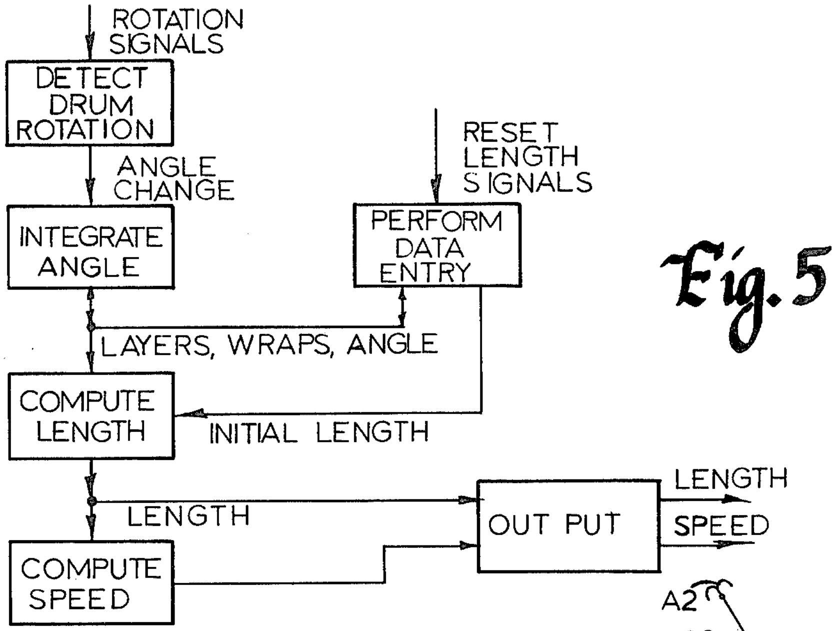
FIG. 5 is a flow diagram of the logical steps in carrying out this invention where the sensor is an optical encoder.

Referring now to FIG. 5 there is a diagrammetric representation of the functions that are performed by the length computer 41 in one embodiment of the present invention. Each box shown in the diagram of FIG. 5 represents or indicates a computation or data manipulation function. Each directional arrow in the diagram indicates the data that is communicated between boxes and the direction of such communication is shown by the arrows. In one such embodiment a typical microprocessor that can be employed is Airpax's Processor Model No. 079-200-0045 (specifically designed for and proprietary to the Skagit Division of Continental Emsco). This processor unit can be purchased with either a watertight NEMA 4 case or with a stainless steel case for harsh (shipboard) environments.

The functional boxes shown in FIG. 5 each perform a particular function and perform such function in a manner and in a sequence that is denoted by the directional arrows.

The Detect Drum Rotation function, performed by counter 43, receives the signals from sensors 26 and 27 as they detect the rotation of drum 20 and the direction of rotation of the drum, reference FIGS. 3 and 4. This function also accumulates the total number of rotation increments which have been detected since the last value of Angle Change, i.e. change from one layer on the drum to a different layer, as produced or sampled by the Integrate Angle function. The Detect Drum Rotation function is shown separately from the Integrate Angle function because these detection functions are performed much more frequently than all other functions.

The Integrate Angle function integrates the Angle Change values which were manually input to computer 41 via operator controls 46 at the start of a manuever or activity, to produce current or instantaneous values for the Angle (layer being worked), Wraps, and the number of layers remaining in storage and/or paid out, in conjunction with the accumulated count of signals from the sensors. This function can therefore determine when the number of Wraps has exceeded the number in a particular layer by reference to the input reference information from operator controls 46 and then, denote that winding of a new layer has started by incrementing the instantaneous number of Layers by one and reducing the instantaneous number of Wraps by the number of wraps in the particular layer as predetermined by the operator inputs. It should be noted that the Integrate Angle function can also determine when the number of Wraps becomes negative, as for example when there has been a payout of a full layer, and at that point the instantaneous number of Layers is decremented by one and the instantaneous number of Wraps available for payout is increased by the number of wraps in one layer as predetermined by the operator inputs. This function can also determine the point when completion of a whole layer occurs by inspecting the preset values for Angle (layers) and then commanding a change to the next set of preset values for Wraps and Angle. Note that the Integrate Angle function both uses and produces values of Layers, Wraps, and Angle.

The Compute Length function computes the length of cable 24 that is currently, instantaneously, paid out, from the preset values of Layers, Wraps, and Angle. The computation that is performed is generally based on equation (1), shown below:

$$L\text{(LENGTH)}=L_o\text{(INITIAL LENGTH)}-(L_1\text{(LENGTH THROUGH WORKING LAYER)}\ (W\text{(NUMBER OF WRAPS)}\times A_w\text{(ANGLE INCREMENTS PER WRAP)}+A_o\text{(ANGLE INCREMENTS)}\times L_w\text{(LENGTH PER INCREMENTS WRAP (LAYERS))}$$

where:

$L_1$ (LENGTH) THROUGH WORKING (LAYER)=an array of numbers, one for each of the possible layers. Each number provides a preset value of the length of cable that is wound on drum 20 in the full layer that is currently being worked plus a value for the length of cable 24 on all lower layers.

$L_w$ (LENGTH PER INCREMENTS)=an array of numbers, one for each of the possible layers. Each number provides a preset value of the length of cable 24 wound on drum 20 in the working layer per rotation increments.

$A_w$ (ANGLE INCREMENTS PER WRAP)=The number of rotation increments per wrap (per complete revolution of drum 20). This number will be a constant preset value for a specific sensor, e.g. optical encoder or magnetic pickup, connected to the drum in a specific fashion embodiment.

W (NUMBER OF WRAPS)=The instantaneous number of wraps accumulated while working a particular layer.

$A_o$ (ANGLE INCREMENTS)=The total number of rotation increments accumulated since the last complete wrap.

The LENGTH THROUGH WORKING LAYER and LENGTH PER INCREMENT Figures depend upon certain drum parameters. The LENGTH THROUGH WORKING LAYER ($L_1$) is a summation of all of the individual LENGTHS PER INCREMENTS ($L_w$) through the working layer. To generate the $L_w$ figures one needs to preset the information in the form of length of cable per rotation increments. To obtain these figures the operator needs to have either the wraps per layer and multiply that by the length per rotation increments or the wraps per layer turns the diameter of the particular layer. In either event the numbers generated are dependent on the drum 20 and its particular dimensions. Furthermore, depending on the type of levelwinding means employed, one may require a certain corrective factor be included. For example, if drum 20 is relatively wide then cable 24 as it wraps on drum 20 may wrap tightly at the ends and loosely in the center. This 'tightness' of wrap becomes more pronounced as the width of drum 20 increases, and when a large number of layers are stored on drum 20 the actual diameter may not be uniform across a particular layer due to settling of cable 24 into the gaps caused by the loosely wrap cable in the center. It should be observed that use of a Lebus Lagging type of drum 20 will effectively minimize if not eliminate this problem.

The COMPUTE SPEED function computes the current Speed of cable payout or reel-in from current and previous values of Length and from the clock 45 input. The speed is computed according to the equations 2 and 3 below:

$$S_r\text{(RAW SPEED)}=L_o\text{(OLD LENGTH)}\times T\text{(TIME UNITS)}\ S\text{(SPEED)}=S_o\text{(OLD SPEED)}\times(S_r\text{(RAW SPEED)}-S_o\text{(OLD SPEED)})\times K_f\text{(FILTER CONSTANT)} \quad (3)$$

where:

$L_o$ (OLD LENGTH)=The value of LENGTH from the last time the value of LENGTH was computed T (TIME UNITS)=The number of time units, desired for the SPEED display, which have passed since the value of OLD LENGTH was last computed. This quantity can be constant if the computation frequency is fixed.

$S_o$ (OLD SPEED)=The value computed for Speed at a time when SPEED was previously computed.

$K_f$ (FILTER CONSTANT)=A value less than 1.0 used to digitally filter RAW SPEED values to obtain SPEED values. This filtering is employed to minimized apparent errors in the SPEED values displayed, resulting from quantization and roundoff errors in both the digital computations of LENGTH and RAW SPEED, and/or the sensing of drum rotation by the sensor employed. The FILTER CONSTANT is inversely proportional to the effective time constant of a low-pass digital filter. The filter constant is a value less than 1 but will vary with the type of output employed amd the tendency for round of errors and the like.

The Output Function sends the values of LENGTH and SPEED as computed to the displays 50. The output function can also include means for conversion of the raw number to different digital formates as desired.

The Perform Data Entry function performs the necessary actions and provides the appropriate commands needed for proper response to the operator commands that are entered through Operator Controls 46. For example, when a Reset Length signal is received, the Perform Data Entry Function computes and stores a new value for INITIAL LENGTH, so that the Compute Length function will now produce a zero value for LENGTH. This function is also available to perform any other actions needed to accomodate the specific inputs generated by Operator Controls 46. INITIAL LENGTH can either be a preset number that is broken down into discrete values for Layers, Wraps, and Angles or it can be computed from the input value for Layers, Wraps, and Angles according to the equation:

$$\text{INITIAL LENGTH}=L_1\text{(LENGTH THROUGH WORKING LAYER)}+W\text{(NUMBER OF WRAPS)}\times A_w\text{(ANGLE INCREMENTS PER WRAP)}+A_o\text{(ANGLE INCREMENTS)}\times L_w\text{(LENGTH PER INCREMENTS)}$$

as previously described.

Length computer 41 is preferably implemented with digital electronics. Each functional box shown and described in FIG. 5 could be implemented with separate specialized electronics devoted to the task of that function. However, it is more cost-effective in a preferred embodiment to implement the bulk of the function boxes with computer programs. These computer programs can be executed by a single computer central processing unit such as the arithmetic unit, microprocessor 44, shown in FIG. 4.

Generally speaking, the computer programs employed to perform each function are executed in the sequence shown in FIG. 5. In the execution sequence of one preferred embodiment, the function which produces each data arrow precedes the functions utilizing the information from each data arrow. The entire sequence is executed repetitively at a suitable rate. For example, to provide the appearance to an operator of a continuous update of the displays, the repetition rate could be on the order of 20 executions per second but obviously the rate could be whatever is desirable under the circumstances.

The Detect Drum Rotation function of FIG. 5 is the function best performed by a set of dedicated and specialized hardware as illustrated in FIG. 3 with the optical encoder sensor. That function must perform an action for each predetermined increment of drum rotation. Since there could be thousands of drum rotation increments per second, depending on pattern 30, the actions shown in FIG. 5 would generally be repeated at a much slower rate. If the Detect Drum Rotation function is performed by dedicated electronics, these electronics will periodically supply, to the Integrate Angle function, the number that is generated, i.e. the ANGLE CHANGE the accumulated umber of rotation increment. This accumulated number of rotation increments is then provided to the Integrate Angle function which reads and utilizes this information in conjunction with the preset input instructions from Operator Control 46.

Figure 6A:
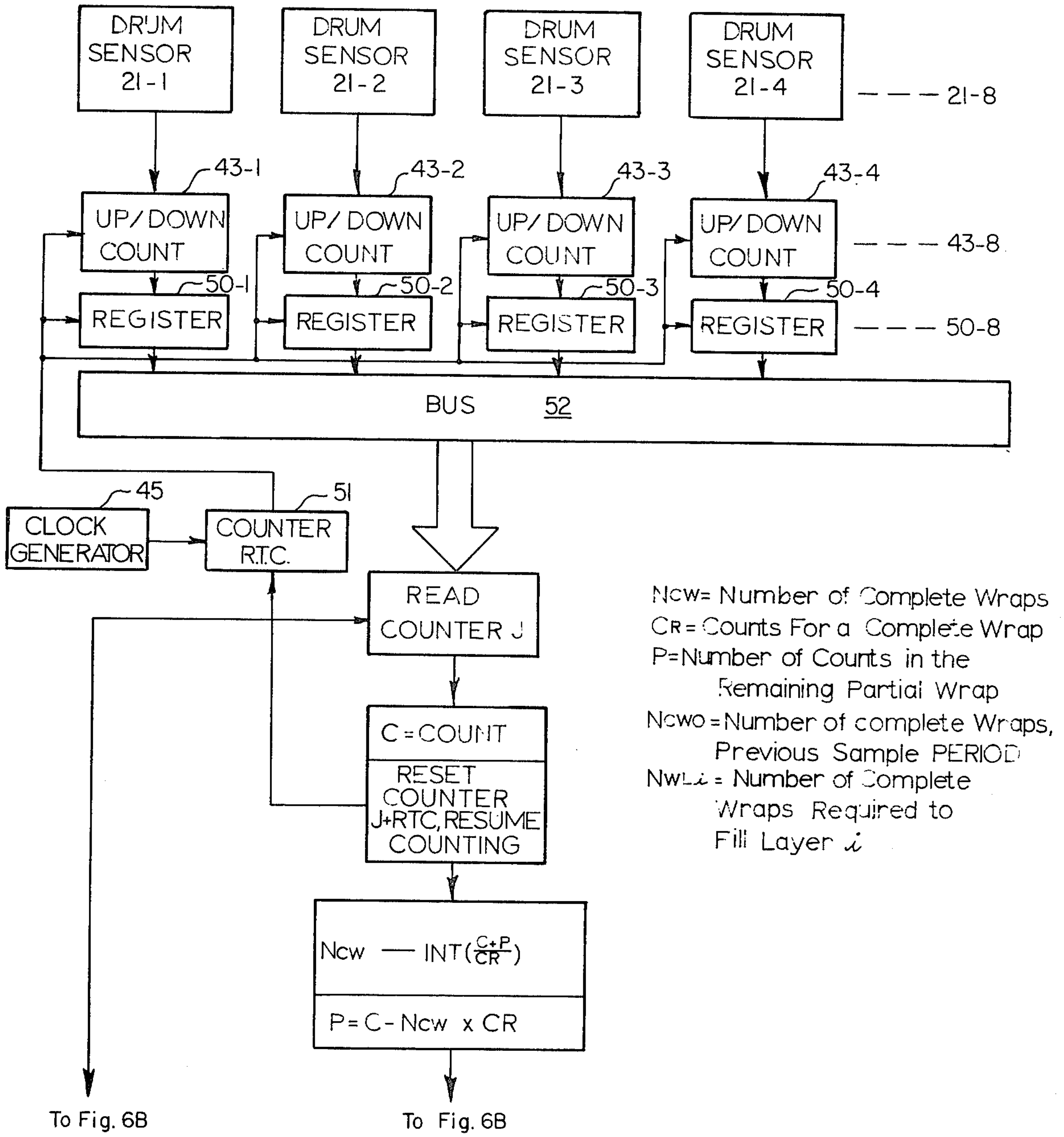
FIG. 6A is a block diagram showing the elements that are employed by a typical computer program for obtaining the input information needed to calculate the length of cable feed and the cable feed rate.
Figure 6B:
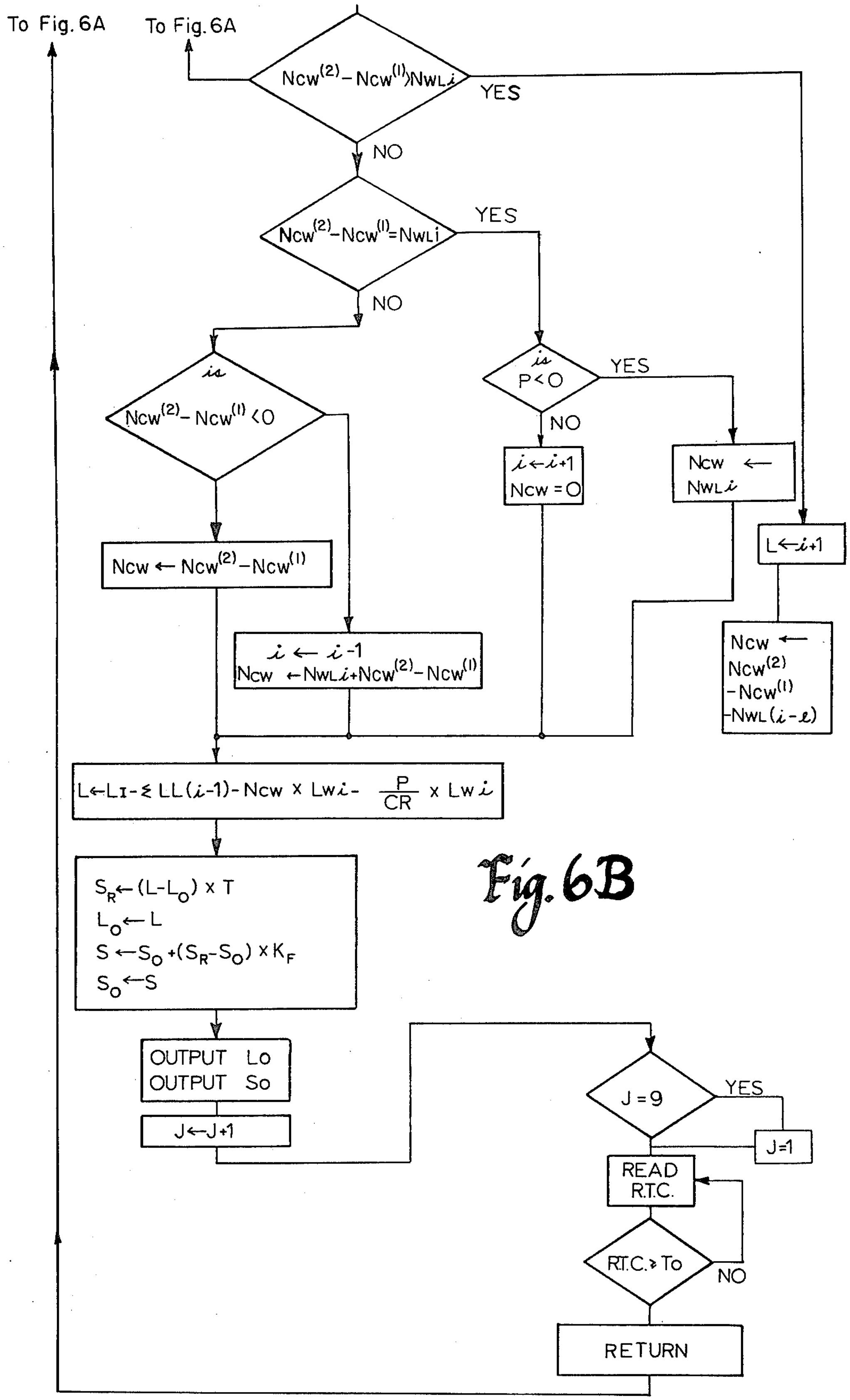
FIG. 6B is a block diagram showing the steps necessary for calculating the length of cable feed and the cable feed rate after obtaining the input information from the elements shown in FIG. 6A.

Obviously, all of the computer functions can be executed at the same frequency by providing the computer with time counter circuitry. If all of the functions, including the Detect Drum Rotation function, are performed by programs executed sequentially by microprocessor 44, the following approach may be used. A clock interrupt circuit could be provided to interrupt execution of a "background" program at a suitable high rate. When the clock interrupt occurs, the Detect Drum Rotation program is executed. Program execution then returns to the "background" program, continuing from the point at which its execution was interrupted. The background program consists of the programs for all other functions, arranged in sequence. The background program executes these programs repetitively with each execution initiated by the clock interrupt program. In this approach, the clock interrupt program regularly initiates another execution of the background program. This initiation of the background program may be implemented using the computer memory which the clock interrupt program increments or sets, and the background program inspects or tests. The flow diagram of this program is illustrated in FIGS. 6A and 6B of the drawings in which the input sources, namely drum sensors 21-1 through 21-8 and up down counters 43-1 through 43-8 are represented as well as the clock 45 which were previously shown in FIG. 4. Registers 50-1 through 50-8 contained within arithmetic or microprocessor unit 44 of FIG. 4 are also illustrated along with an RTC counter 51.

The computer program is executed with data from those sources which is then transmitted via bus 52 in the sequence of operation that is shown schematically below bus 52 in FIG. 6A.

Initially the selected drum sensor 21-1 through 21-8, designated J in the drawing in the READ COUNTER J function box, is read and then encoded and stored as a part of register 50-1 through 50-8, respectively. The count in the designated register 50-1 through 50-8 is read and the RTC counter 51 is reset.

In carrying out the calculations, the instantaneous number of complete wraps Ncw is stored and this number is changed whenever the instantaneous rotation increment count C as generated by pattern 30 to sensors 26 and 27 equals the number of counts per wrap $C_R$. The number of counts remaining in the wrap P is likewise calculated by substracting the present instantaneous count C from the product of the stored number of complete wraps Ncw and the counts for a complete wrap $C_R$. Thereafter, as shown in FIG. 6B, the previous number of complete wraps Ncw(1) plus the present number of complete wraps Ncw(2) is compared with the number of complete wraps per layer Nwli. If the current wraps per layer Ncw(2) is different from the previous number Ncw(1) sufficiently to be equal to a full number of wraps per layer Nwli, then the number of layers L is adjusted accordingly by one. The new number of complete wraps Ncw(2) of this latest sample is then stored in place of the old number Ncw(1). Hence the number of layers L is derived from the number of complete wraps of the previous sample Ncw(1), the number of complete wraps in the current sample period Ncw(2) and the number of complete wraps to fill a layer Nwli.

Note that the comparison above can result in either a positive or a negative comparison and subsequent positive or negative adjustment of the layer value L. For example, if exactly the number of complete wraps to fill a layer is found upon sampling, i.e. Ncw(2)-Ncw(1)=Nwli, a comparison for partial wrap is made. If there are no partial wraps, the number of layers is incremented by one and the Ncw number to be retained for the next calculation is set to zero. Note that after calculation, the present number Ncw(2) becomes the previous number Ncw(1) for the next calculation. If the count P is less than zero, indicating a reversal of direction since the last calculation, then the number of complete wraps for the previous period is stored and the value of Ncw is introduced into the length calculation.

If no equality is found between the sum of the previous sample period complete wraps Ncw(1) plus the present number of complete wraps Ncw(2), and the number of complete wraps per layer Nwli then the same sum is compared with the value zero. If the result is less than zero, then it is decremented by 1 and the new layer wrap count Ncw(2) is stored and entered in memory for the length equation. If the previous period complete wrap count Nwc(1) is less than zero, then the previous sample is stored in memory for the length equation.

Next, the cable length pay out L is calculated, employing equation (1) previously described, and then stored. Thereafter the instantaneous cable speed is calculated, using equations (2) and (3) previously described, and then stored. The system outputs and displays then register both results, i.e. the cable length L and speed S.

After the completion of these calculations the cable designation J, e.g. 1-8, is incremented by one and the same calculations and information stored for J+1 through J=n, or until the last cable calculation is completed. Thereafter the count of J is returned to J=1 and the count is resumed.

These calculations allow virtually continuous monitoring, calculation and display of cable length payout L and cable speeds for all of the anchors A1 through A8. Given this information, historical data on cable movement can be easily derived from the system and the movement of a ship in a given direction can be accomplished by manipulating the speed rate of the drum motor 28 accordingly.

The present invention can be varied or modified in an endless variety of ways. For example,

Optimums and Additions

Many variations and additions are possible upon the disclosed invention. Some of the more interesting variations are: Outputs used for Automatic Control outputs from the Payout Indicator system can may go directly to the drum controls for automatic or semi-automatic drum operation. Similarly, inputs normally provided by an operator may alternately be provided by drum control or other automatic mechanisms. In particular, in one typical embodiment the cable is known to have a tendency to stretch over time and use. To accomodate the error produced by the stretching cable, the system would be set up to have a partial last layer. The expected stretch would then be allowed to fill in the last layer. This stretch could easily be managed by the operator by providing an alarm system to signal an 'increase' in the length of cable that stored in the last layer. This signal could be used to update the other inputs for the last layer or to signal when the cable material is in need of replacement.

Other information that is produced or used by the Length Computer 41 can be provided as outputs, such as the number of layers of cable now wound on the drum. Additionally, the LENGTH, SPEED, and other outputs could be provided in digital and/or analog form. Also, a variety of display devices could be used, such as electric meter, LED (light emitting diode), CRT (cathode ray tube), or liquid crystal display devices. Analog output forms may frequently use multi-range displays with automatic range switching. All of the output (or internal) quantities that are produced or used could be automatically compared against maximumor minimum value limits, with a special output signal being generated to indicate when each such limit is exceeded. These limit-exceeded signals may be used to signal error conditions and/or to signal the need to take special actions external actions to the Payout Indicator system.

The incremental rotation signals produced by the sensor e.g. the optical encoder or the magnetic pickup, can be presented in various forms. Two possible forms are:

(a) As two pulsed binary signals, i.e. where a pulse on one signal line signals rotation by one increment in the positive rotating direction and a pulse on the other signal line indicates rotation by one increment in the negative direction; or (b) Two binary signals which are each square waves when the drum rotates, i.e. where the two square waves are about 90 degrees out of phase an each change of value of each binary signal thus indicates rotation by one increment and the direction of the signal change and the value of the other signal can be interpreted to determine whether the rotation is positive or negative. (Note that this is the approach shown and described in FIG. 3.)

The Operator Controls 46 can be modified to provide for entry of additional or alternate information, such as, the INITIAL LENGTH of cable wound on the drum when no cable is paid out, or the LENGTH paid out at the present time. Also, two or more of the data variables, i.e. ANGLE, WRAPS, and LAYERS may be combined into one data variable. For example, ANGLE and WRAPS could be combined into one variable indicating whole and fractional wraps of cable on the drum since this might simplify the implementation if there are a fixed and convenient number of rotation increments in one drum revolution. The inputs to the Operator Controls 46 will also be different depending upon the particular requirements of a given application. The following are typical inputs for the noted application:

(a) Windlass (chain)—initial inputs to computer 41 include:
- Number of pulses per foot of chain
- Full scale of chain speed meter
- Speed and footage to display in feet or meters
- Length display output
- Overspeed of chain alarm set point
- Chain length (close contact) alarm set point (b) Winch (Hoisting)—initial inputs to computer 41 include:
- Total layers when drum is fully wound
- Number of wraps per layer
- Number of feet of line per layer
- Number of feet of line change per layer
- Number of pulses per drum revolution
- Full scale of line speed meter
- Speed and footage to display in feet or meters
- Length display output
- Overspeed of chain alarm set point
- Chain length (close contact) alarm set point
- Number of wraps on top layer when drum is full wound.

It should be noted that the amount of cable stored in each layer of the drum will vary somewhat due to the increasing diameter of the successive layers. As noted above with the inputs for the winch system, one of the inputs could be the 'number of feet of line change per layer'. It has been determined that the change of feet from one layer to the next is constant, e.g. first layer=X feet, second layer=first layer feet+K(constant) feet, third layer=second layer feet+K(constant) feet, and so on.

Finally, the conversion factors used to compute LENGTH, namely LENGTH THROUGH LAYER and LENGTH PER INCREMENT, may be obtained in several alternate ways:

(a) these arrays may be determined before the Payout Indicator system leaves the factory, and stored in a read-only computer memory (ROM);

(b) these arrays may be computed by the Length Computer when the computer is first turned on for each period of use, hence the computed values would be stored in computer memory for later use;

(c) the single value needed for the current LAYERS value may be computed whenever the value of LAYERS changes; and (d) the single value needed for the current LAYERS value may be computed each time that the LENGTH value is being computed.

The above described system is therefore but one embodiment of the present invention. As indicated various improvements, modifications and alternative applications and uses will be readily apparrent to these of ordinary skill in the art. Accordingly, the scope of the present invention should be considered in terms of the following claims and it is not to be limited to the details of the embodiment and its structure and operation, as shown and described in the specification and drawings.

We claim:

1. A system operable in conjunction with a plurality of cable feed means of the type which includes a cable, a plurality of rotatable drum means, each drum means having a drive means and a core with a predetermined length and diameter for storing and feeding cable and having edge flanges for retaining said cable thereon in a plurality of layers each having a predetermined diameter and number of wraps per layer, for precisely measuring length of cable feed and current feed rate, the system comprising:

a drilling vessel anchored by said plurality of cable feed means;

a plurality of sensor means adapted to detect angular rotation of each of said drum means, and to provide signals corresponding to increments of rotation of said drum means; and a computer means, coupled to all of said sensor means and adapted to receive inputs of said signals corresponding to said incremental angular rotation of said drum means from said sensor means for providing output signals indicating current feed rate and the length of cable feed from said rotatable drum means and for controlling the length of cable fed from and the current feed rate of each of said rotatable drum means, whereby said drilling vessel is moved in a desired direction by appropriately infeeding or paying out said cable on each of said cable feed means.

2. The system in accordance with claim 1 wherein said system includes a clock means connected to said sensor means to allow an operator to generate said signals for discrete time periods.

3. The system in accordance with claim 1 wherein said computer includes a memory into which an operator stores said predetermined values for said core and said layers of cable and a program means for operating on the signal inputs from said sensor means where said sensor means includes a clock means connected thereto and said predetermined values in said memory to substantially precisely calculate cable feed rate and length of cable fed out.

4. The system in accordance with claim 13 wherein said system includes an up/down counter coupled to each of said sensor means wherein each counter determines the direction of angular rotation of said drum means and that generates said signal inputs for said computer whereby said calculated cable feed rate can be indicated for both cable payout and infeed.

5. The system in accordance with claim 1 wherein said system includes a means for displaying said current cable feed rate and the length of cable fed from said drum.

6. A system for feeding a plurality of cable lines and for simultaneously precisely measuring length of cable feed and current feed rate of each of said cable lines comprising:

a plurality of cables each having a predetermined diameter;

a plurality of rotatable drum means each having a core with a predetermined length and diameter for storing and feeding said cable, and having edge flanges for retaining said cable thereon in a plurality of layers each having a predetermined diameter and number of wraps per layer;

a plurality of drive means one for each of said drum means, suitably supported, for rotating a plurality of said drum means;

a plurality of sensor means adapted to detect angular rotation of each of said drum means and speed of rotation of said drum means and to provide signals corresponding to increments of rotation of said drum means; and a computer means, coupled to all of said sensor means and adapted to receive inputs of said signals corresponding to said incremental angular rotation from said sensor means for providing output signals indicating feed rate and the length of cable feed from said drum means and for controlling the length of cable fed from and the current feed rate of each of said rotatable drum means, whereby said cables are attached to a drilling vessel and are controllably fed so as to cause said drilling vessel to move in a desired direction.

7. The system in accordance with claim 6 wherein said system includes a clock means connected to said sensor means to allow an operator to generate said signals for discrete time periods.

8. The system in accordance with claim 6 wherein said computer includes a memory into which an operator stores said predetermined values for said core and said layers of cable and a program means for operating on the signal inputs from said sensor means, where said sensor means includes a clock means connected thereto, and said predetermined values in said memory to calculate cable feed rate and length of cable fed out.

9. The system in accordance with claim 8 wherein said system includes a means for displaying said current cable feed rate and the length of cable fed from said drum.

10. The system in accordance with claim 6 wherein said system includes an up/down counter coupled to each of said sensor means wherein each counter determines the direction of angular rotation of an associated drum means and generates said signal inputs to said computer enabling said calculated cable feed rate to be indicated for both cable payout and infeed.

* * * * *